No. 625,461. Patented May 23, 1899.
G. J. OVERSHINER.
REVERSIBLE PLOW.
(Application filed July 16, 1898.)

(No Model.) 2 Sheets—Sheet 1.

Witnesses

Inventor
Gideon J. Overshiner,
by
Attorneys

THE NORRIS PETERS CO., PHOTO-LITHO., WASHINGTON, D. C.

No. 625,461. Patented May 23, 1899.
G. J. OVERSHINER.
REVERSIBLE PLOW.
(Application filed July 16, 1898.)
(No Model.) 2 Sheets—Sheet 2.
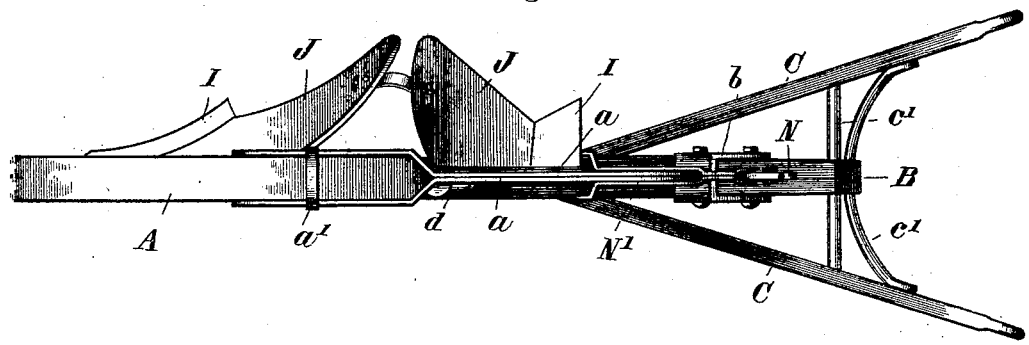
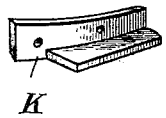
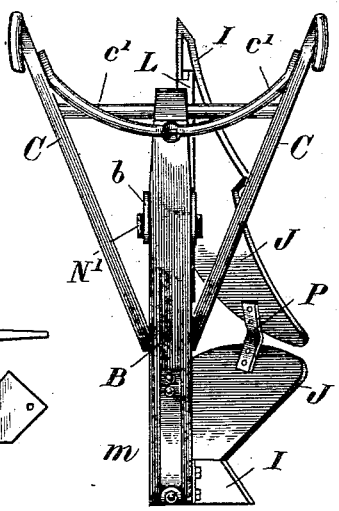
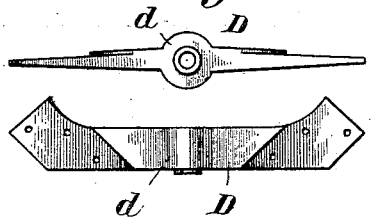
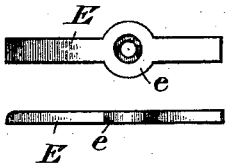
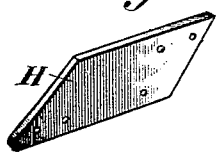
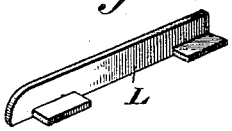
Witnesses
Inventor
Gideon J. Overshiner,
by O'Meara
Attorneys

UNITED STATES PATENT OFFICE.

GIDEON J. OVERSHINER, OF SAN DIEGO, CALIFORNIA, ASSIGNOR TO CASTANOS PAINE, OF SAN DIEGO COUNTY.

REVERSIBLE PLOW.

SPECIFICATION forming part of Letters Patent No. 625,461, dated May 23, 1899.

Application filed July 16, 1898. Serial No. 686,193. (No model.)

*To all whom it may concern:*

Be it known that I, GIDEON J. OVERSHINER, a citizen of the United States, residing at San Diego, in the county of San Diego and State of California, have invented a new and useful Reversible Plow, of which the following is a specification.

My invention relates to improvements in plows, and more particularly to that class known in the art as "reversible" plows, its object being to produce an improved plow of the class specified which shall be adapted to work on level ground as well as sidehill, and, in fact, for all purposes for which a plow is used.

A further object is to produce a reversible plow, having each plow complete and shapely, which shall be cheap to construct, easy to operate, capable of being easily turned from side to side of the beam, so that when turned on one side of the beam it shall be a complete right-hand plow and when turned on the other side it shall be a complete left-hand plow, and which shall be effectual for all work.

With the above objects in view the invention consists in the novel features of construction, combination, and arrangements of parts, which will be hereinafter fully set forth, particularly pointed out in the claims, and illustrated by the accompanying drawings, in which—

Figure 1:
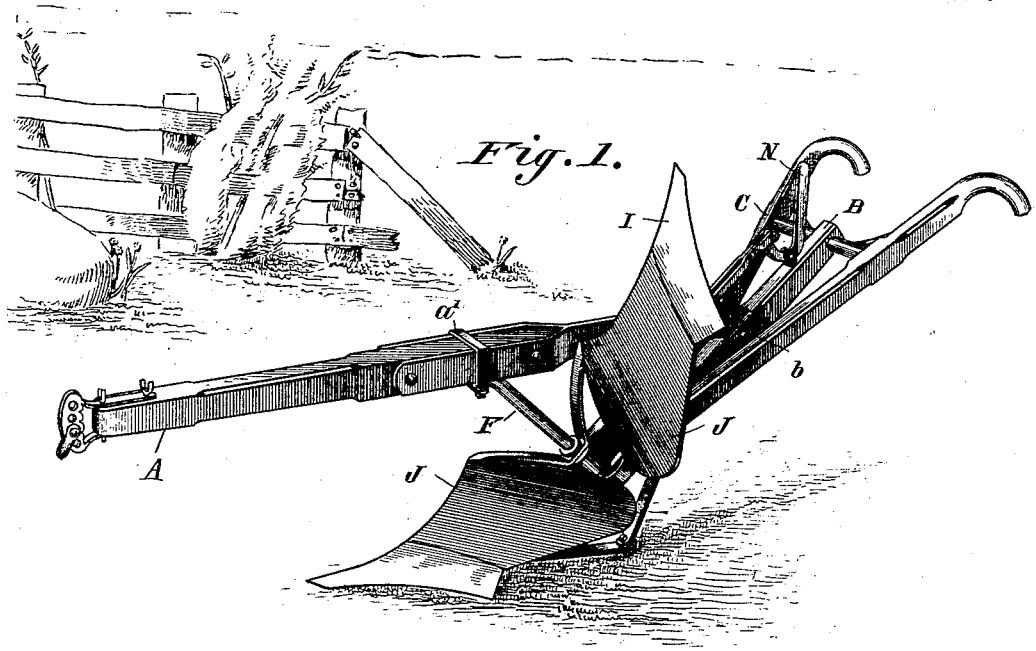
Figure 2:
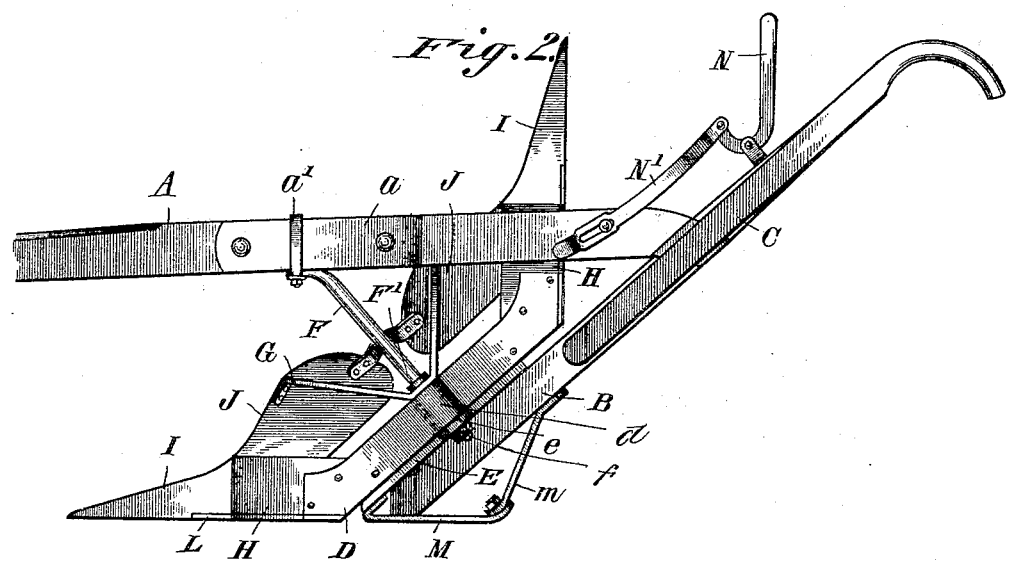

Figure 1 is a perspective view of my improved plow. Fig. 2 is a side elevation of the same. Fig. 3 is a top plan view. Fig. 4 is a rear elevation. Figs. 5 to 9 are detail views of the various parts.

Referring now more particularly to the accompanying drawings, A designates the forward part of the plow-beam, which may be formed of wood, as in the ordinary construction of beams, and $a\ a$ represent two plates constituting the rear portion of the beam, said plates being separated at their forward ends to extend on opposite sides of portion A, to which they are secured by a clip $a'$ and suitable bolts. The rear ends of the plates are also separated to form a clamp $b$ to receive the stock B, which is secured therein.

C C designate the handles of the plow, which are secured at their lower ends to the stock and at their upper ends braced by suitable braces $c'$.

Secured by clips $a'$ at one end to the under side of the beam proper, A, is a brace F, which is formed with a shoulder $F'$ adjacent to its opposite end and at said opposite end is threaded to extend through the stock D and a plate E, secured to the latter, and receive a securing-nut on its projecting end. This brace also serves as a shaft upon which the double landside revolves, said landside being formed with a central bearing $d$, which engages on a circular flange $e$, (see Fig. 2,) formed on plate E, said landside being retained in proper position by the shoulder $F'$ upon the brace F. The landside is formed with a projection on its under side to fit into a circular depression formed in the stock-plate E. (See Figs. 5 and 6.)

H H designate connecting-plates, which are secured to the respective ends of the double landside and at their opposite ends to the plowshares I I by means of rivets.

J J indicate the moldboards, which are connected with the plates H and shares I by angle-plates K, said moldboards being connected together by a brace P. A U-shaped brace G is secured at its respective ends to the moldboards and formed with a central aperture, whereby it may be positioned upon the brace F between the central bearing of the double landside and the shoulder $F'$ formed upon said brace F. The plowshares and moldboards are right and left handed, and when one of said plowshares is turned up against the beam it will rest against the metal plates $a\ a$ in the rear of the portion A of the beam, and when in such position the landside of said share will be perpendicular as to the landside and bottom of said share, and the ends of said landside are formed with a depression, so that when the share and moldboard are attached the straight landside the share shall, when turned up against the beam, be on a line with the longitudinal center of the latter.

M designates a metal shoe covering the lower end of the stock, the bottom of which is on a line with the bottom of the plowshare and extends rearward to a point on an angle from the line made by the bottom of the share when turned up against the beam, said share being connected with the stock by a brace m.

Wear-plates L are fitted upon the lower sides of the double landside and are designed to take the wear from the latter, said plates being secured thereto by suitable bolts or nuts, so that when worn out they may be replaced at a little cost as compared with the cost of replacing the worn-out landside.

For holding one of the plowshares in proper position I provide a bell-crank lever N, which is suitably pivoted to the stock, and pivoted to said lever is a sliding locking-lever N', which has its lower end bifurcated, with the bifurcations extending on opposite sides of the plates a a. These bifurcations are slotted intermediate their ends, through which slots a bolt n passes, said bolt extending through said plates. By moving the operating-lever N forwardly said locking-lever is moved downwardly until the lower end thereof engages the upper plowshare and holds the same to the beam. When it is desired to reverse the plowshares, said operating-lever is moved rearwardly, disengaging the locking-lever, so that said revolving landside may be operated.

Having thus fully described my invention, what I claim as new, and desire to secure by Letters Patent of the United States, is—

1. The combination of the beam A having side plates a, the stock secured between the rear ends of said plates and provided with a bearing, the plate E on the upper face of the stock perforated in line with the bearing in the stock and provided with the circular flange e around said perforation, the brace F passing through the plate E at its lower end, the clip a' securing the brace to the under side of the beam at its upper end, the annular shoulder or flange F' on brace F, the double landside mounted on brace F and provided with annular flange d' engaging in circular flange e of plate E, the angular brace G mounted on brace F between its shoulder F' and the double landside and connected at its ends to the opposite moldboards J, brace P connecting the moldboards and bent laterally to clear the brace F, the wear-plate L provided with side recesses to fit over the beams when raised into inoperative position, and means for clamping the inoperative landside to the beam, substantially as described.

2. The combination of the beam A having side plates a, the stock secured between the rear ends of said plates and provided with a bearing, the plate E on the upper face of the stock perforated in line with the bearing in the stock and provided with the circular flange e around said perforation, the brace F passing through the plate E at its lower end, the clip a' securing the brace to the under side of the beam at its upper end, the annular shoulder or flange F' on brace F, the double landside mounted on brace F and provided with annular flange d' engaging in circular flange e of plate E, the angular brace G mounted on brace F between its shoulder F' and the double landside and connected, at its ends to the opposite moldboards J, brace P connecting the moldboards and bent laterally to clear the brace F, the wear-plates L provided with side recesses to fit over the beam when raised into inoperative position, the forked bar N embracing the beam and slotted in its forks, the bolt n passing the beam and said slots, and the bell-crank lever pivoted to the stock having its forward arm pivotally connected to arm N and its rear arm formed into a handle, substantially as and for the purposes set forth.

GIDEON J. OVERSHINER.

Witnesses:
J. N. BRINCH,
I. H. KING.